(12) United States Patent
Meyer et al.

(10) Patent No.: US 8,418,991 B2
(45) Date of Patent: Apr. 16, 2013

(54) FAUCET VALVE WITH SAFETY HANDLE

(75) Inventors: Michael H. Meyer, Sagamore Hills, OH (US); Michael A. Kolar, North Royalton, OH (US); Eric J. McCarty, Strongsville, OH (US)

(73) Assignee: The Meyer Company, Cleveland, OH (US)

( * ) Notice: Subject to any disclaimer, the term of this patent is extended or adjusted under 35 U.S.C. 154(b) by 1134 days.

(21) Appl. No.: 12/015,137

(22) Filed: Jan. 16, 2008

(65) Prior Publication Data
US 2008/0169440 A1 Jul. 17, 2008

Related U.S. Application Data

(60) Provisional application No. 60/880,752, filed on Jan. 16, 2007.

(51) Int. Cl.
*F16K 35/00* (2006.01)
(52) U.S. Cl.
USPC .............................. 251/99; 251/263; 251/331
(58) Field of Classification Search .................. 251/99, 251/263, 331, 335.2; 137/801; 222/567, 222/509, 518, 469
See application file for complete search history.

(56) References Cited

U.S. PATENT DOCUMENTS

| | | | | |
|---|---|---|---|---|
| 3,104,089 A | * | 9/1963 | Seltsam | 251/263 |
| 3,207,472 A | * | 9/1965 | Seltsam | 251/335.1 |
| 3,426,798 A | * | 2/1969 | Chernak | 251/331 |
| 3,459,345 A | * | 8/1969 | Giese et al. | 222/518 |
| 3,828,981 A | | 8/1974 | Linkletter | |
| 3,904,174 A | * | 9/1975 | Giese | 251/335.2 |
| 4,372,467 A | | 2/1983 | Pritchitt | |
| 5,449,144 A | | 9/1995 | Kowalics | |
| 6,086,045 A | * | 7/2000 | Moon | 251/263 |
| 6,427,880 B1 | * | 8/2002 | Hirose et al. | 222/509 |
| 6,454,243 B2 | * | 9/2002 | Kawolics et al. | 251/262 |
| 6,662,978 B2 | * | 12/2003 | Lin et al. | 222/509 |
| 6,868,994 B2 | * | 3/2005 | Kawolics | 222/517 |
| 6,962,319 B2 | * | 11/2005 | Zheng | 222/518 |
| 7,299,956 B2 | * | 11/2007 | Haglund et al. | 222/518 |
| 7,325,701 B1 | * | 2/2008 | Meyer et al. | 221/310 |

OTHER PUBLICATIONS

International Search Report for International Application No. PCT/US2008/051166.
Written Opinion of the International Searching Authority for International Application No. PCT/US2008/051166.

* cited by examiner

*Primary Examiner* — John K Fristoe, Jr.
*Assistant Examiner* — Andrew J Rost
(74) *Attorney, Agent, or Firm* — Fay Sharpe LLP

(57) ABSTRACT

A faucet for controlling the dispensing of liquids including a valve element movable from a first position for blocking flow between an inlet and outlet to a second position for permitting flow between the inlet and the outlet. An insert member is rotatably connected to a bonnet and defines an opening through which a stem extends. The insert member is located with no portion being clamped between the bonnet and a valve body. An actuator handle assembly includes a lever pivotally connected to an end of the stem and a cam actuator connected to the lever. The cam actuator moves between an engaged position in which movement of the lever is effective to move the valve element from its first position to its second position and a disengaged position in which movement of the lever is ineffective to move the valve element from its first position to its second position.

16 Claims, 6 Drawing Sheets

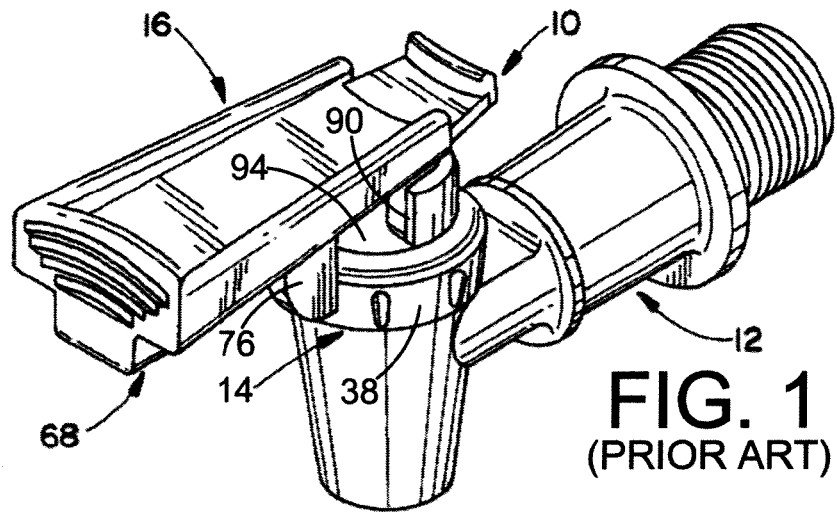
FIG. 1
(PRIOR ART)
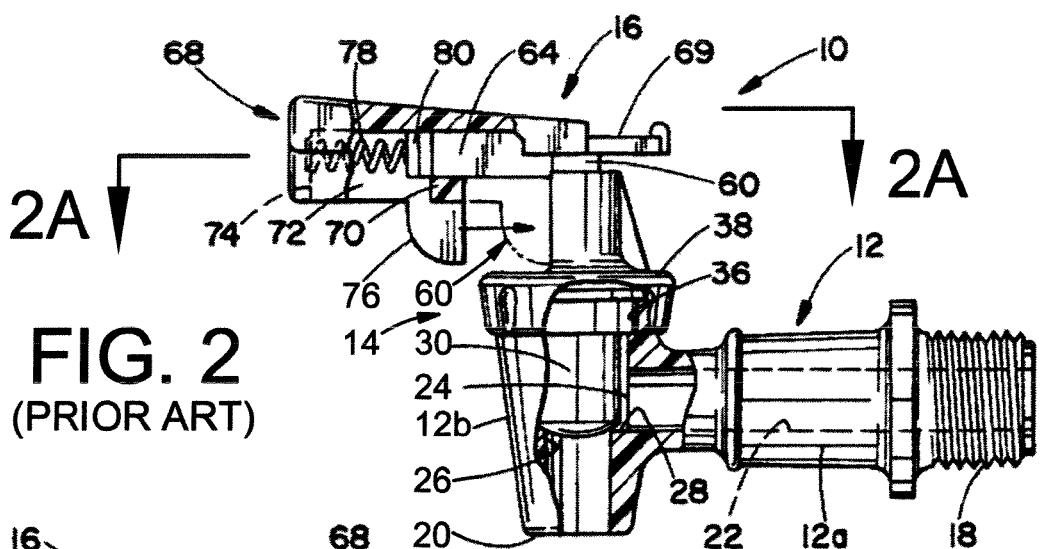
FIG. 2
(PRIOR ART)
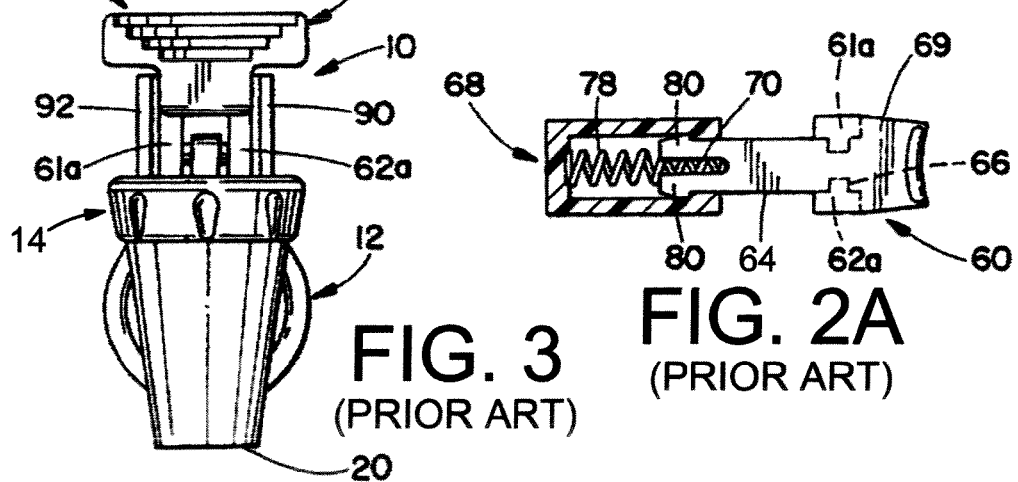
FIG. 3
(PRIOR ART)
FIG. 2A
(PRIOR ART)

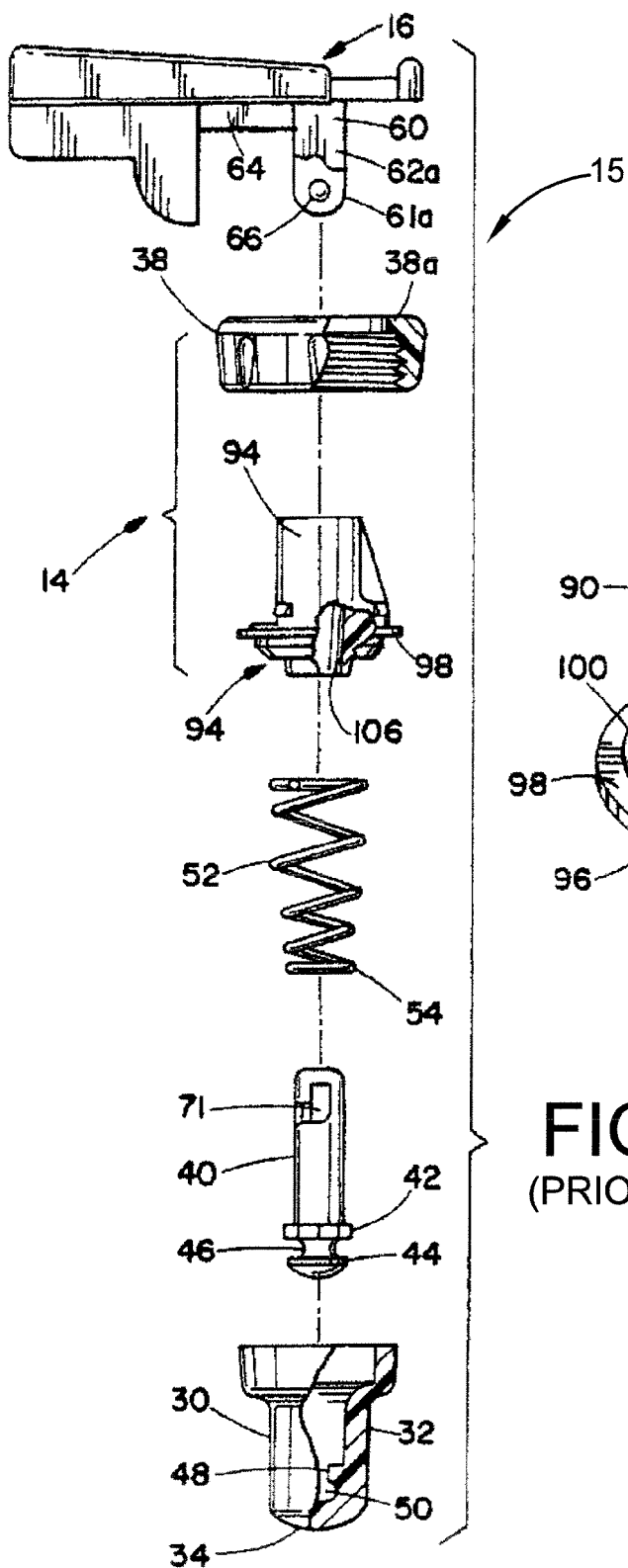
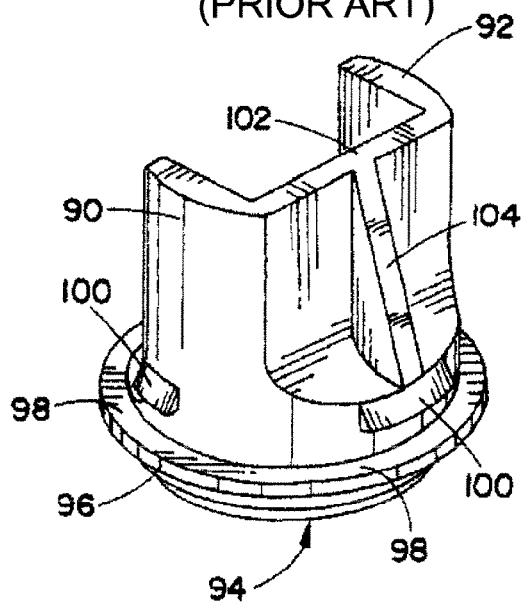
FIG. 4
(PRIOR ART)
FIG. 5
(PRIOR ART)

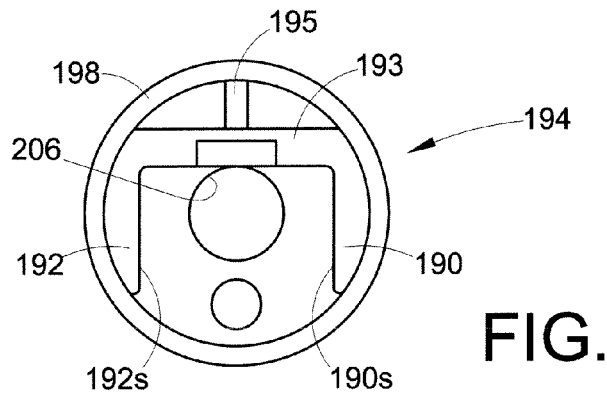
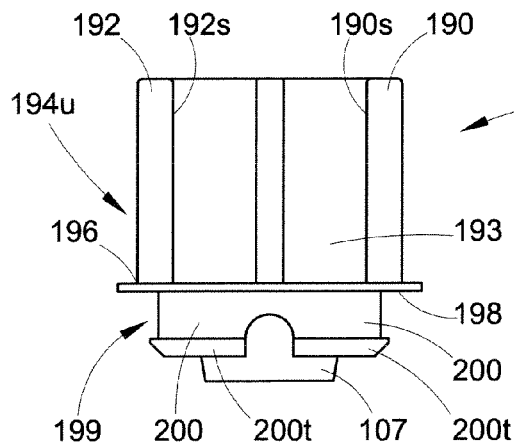
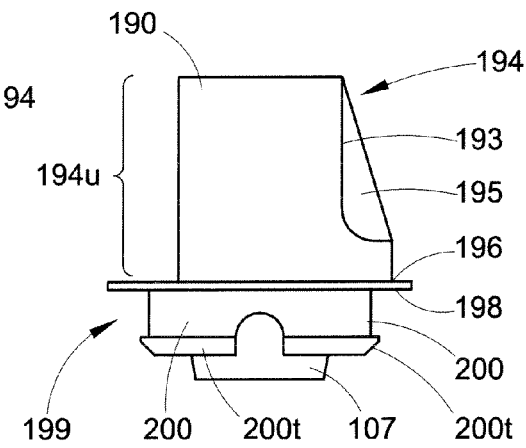
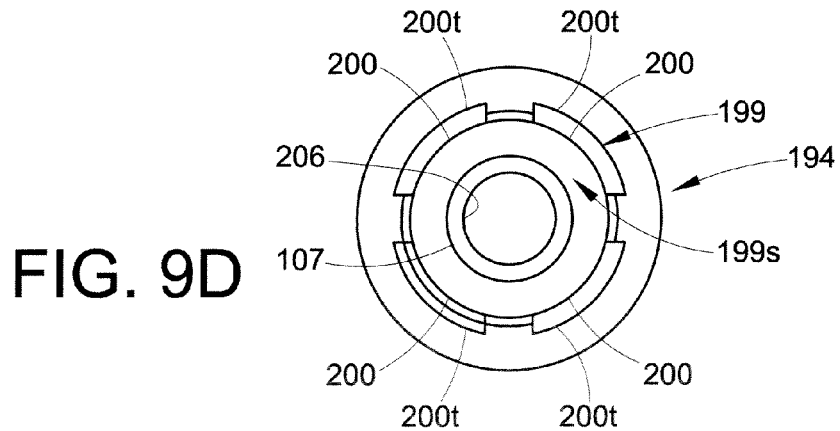

FAUCET VALVE WITH SAFETY HANDLE

CROSS-REFERENCE TO RELATED APPLICATION

This application claims priority from and benefit of the filing date of U.S. provisional patent application Ser. No. 60/880,752 filed Jan. 16, 2007, and said prior application Ser. No. 60/880,752 is hereby expressly incorporated by reference herein.

BACKGROUND

A known faucet valve including a safety handle is disclosed in U.S. Pat. No. 5,449,144, and the disclosure of said patent is hereby expressly incorporated be reference into the present specification. The safety handle faucet disclosed in U.S. Pat. No. 5,449,144 has enjoyed commercial success, but a need has been identified for an alternative version, in which certain assembly steps are simplified and in which certain assembly errors can be avoided, without decreasing safety or performance.

FIGS. 1 through 3 show the general overall arrangement of a known dispensing type valve or faucet assembly 10 that generally includes a main body 12 that carries a valve element and bonnet arrangement 14. A suitable manually operable cam actuator handle assembly 16 is arranged for providing selective opening of the valve element.

The body 12 is formed of a metal or suitable plastic or resinous material and has an inlet end 18 and a nozzle or outlet end 20. The horizontal portion 12a of the body 12 defines the inlet passage or inlet 22 that joins with a cylindrical or otherwise shaped valve chamber 24 that extends vertically in body section 12b. Chamber 24 has an outlet passage or outlet 26 that is generally in alignment with the axis of the valve chamber 24 and provides an outlet passage to the outlet end 20. It will be noted that the annular shoulder at the juncture between valve chamber 24 and the outlet passage 26 generally provides a seat 28 of flat, annular configuration.

Positioned within the valve chamber 24 and arranged to cooperate with the seat 28 to control flow from the valve chamber to the outlet passage 26 is a seat cup valve element 30 which has a generally cup-like shape and is preferably molded from silicon rubber or some suitable elastomer capable of withstanding the operating conditions to which it is to be subjected in the faucet assembly 10. As illustrated (see also the exploded view of FIG. 4), the cup-like valve element 30 has a lower cylindrical or frusto-conical end portion 32 which is of smaller diameter than the interior of the valve chamber and terminates in a closed end wall 34. End wall 34 is sized and arranged so that it can sealingly engage about the seat 28 when it is driven downwardly to the position shown in FIG. 2 to block liquid flow from the inlet passage 22 and valve chamber 24 into the outlet passage 26. The upper end of the valve element 30 extends radially outward as shown and is sized so as to be tightly received in the larger diameter counterbore section 36 formed about the upper end of valve chamber 24 (see FIG. 2).

The valve element 30 is maintained in position and sealingly engaged about its upper end with the counterbore 36. It is held in this position by a bonnet element 38 that is threaded to the upper end of the vertical section 12b of body 12 and, in a manner subsequently to be described, clamps axially downward on the upper edge of valve element 30.

The valve element 30 is joined to an inner end of an operating stem element 40 (see FIG. 4) that extends outwardly of the valve body through a central opening 106 in an insert member 94 connected to the bonnet 38. As shown, the lower or inner end of stem 40 has a spaced pair of flanges 42 and 44 that define a circumferential groove 46. The lower end of the stem is thus adapted to be tightly received and resiliently gripped in the interior lower end of the valve element 30. Note that the valve element 30 includes an inwardly extending flange portion 48 to thereby define a closed lower end 50 that encompasses the flange 44 to provide a connection between the stem and cup when the stem is forced into position in the valve element.

Positioned coaxially about the stem 40 is a compression coil spring 52 that has a reduced diameter lower end 54 that rests on the upper surface of flange 42. The spring 52 thus maintains the stem 40 and the valve element 30 continually biased toward a closed position as shown in FIG. 2.

The operating stem and valve element are moved between the first, lower or closed position (FIG. 2) and a second, upper or open position, where the seat cup end wall 34 is lifted away from the seat 28 to allow liquid flow into the outlet passage 26, by the previously-mentioned cam actuator handle assembly 16 that selectively pulls the seat cup end wall 34 away from the seat 28 with associated resilient deformation of the seat cup valve element 30. Although the actuator handle assembly 16 could vary substantially, from what is shown, the subject assembly 16 is a known form of safety handle which is arranged to prevent movement of the valve stem in a vertically upward direction until the user has manually moved the handle to an operating position, at which time it can be rotated to move the stem open, in order to prevent unintended opening of the faucet 10.

In particular, and as best understood by reference to FIGS. 2, 2a, and 4, the actuator handle assembly 16 includes a two-part, manually operable handle including a first lever-like component 60 that has a pair of laterally spaced, downwardly extending leg elements 61a and 62a that join to a radially extending lever body 64. The legs 61a, 62a each include inwardly extending, short pivot pin portions 66 that are arranged to join to slots or grooves 71 formed in opposite sides of the outer or upper end of stem 40 (see FIG. 4).

Slidably received on the pivoted lever body 64 is a cam actuator or handle element 68. The cam actuator or handle element 68 is linearly axially slidable on the lever 64 and is retained thereon by side flanges that extend down on laterally opposite sides of the end portion 69. Also, a transverse retainer bar 70 extends between opposite sides 72 and 74 of the cam actuator element 68. Sides 72 and 74 further define a pair of spaced cam surfaces 76. The operation of cam surfaces 76 will subsequently be described. However, for the present, it should be noted that the cam actuator element 68 is normally maintained biased to the left in a disengaged position as shown in FIG. 2 by a compression spring 78 suitably retained in position between an end wall on cam actuator element 68 and the outer end of lever portion 64. Outward movement of the cam actuator element 68 beyond the solid line position shown in FIG. 2 is prevented by laterally extending end shoulders 80 carried on the lever 64 and engaging suitable stop surfaces on the cam actuator element 68.

With the cam actuator element 68 in its outwardly biased, disengaged position as shown in FIG. 2, downward pivotal movement of the actuator handle 16 about the outer end of the stem 40 results in abutment of the lower corner of the cam elements 76 with the side of the body 30 such that no upward or outward pulling force is placed on the stem 40 by this engagement since the forces are generally acting radially of the stem. However, when the cam actuator element 68 is moved radially inward to its engaged position as shown in dotted lines in FIG. 2 by compression forces on the outer end, and thereafter pivoted by manual force in a counterclockwise direction as viewed in FIG. 2, the cam surfaces 76 are in position to engage with the top of the bonnet 38 and/or the insert member 94 connected to the bonnet 38 as described below) and cause an upwardly/outwardly directed force to be applied to the stem 40 to pull the seat cup valve element 30 away from the seat 28 and open the valve. Upon release of the actuator handle 16, the compression spring 52 forces the resilient seat cup valve element 30 back against the seat 28 and causes the valve to close. The spring 78 moves the cam actuator element 68 back to the solid line position of FIG. 2. Thus, as can be seen, the valve is normally moved to an open position only by a combination of movements which normally could never result merely by inadvertent contact with the handle and cam actuator assembly 16. That is, the handle must be compressed into the dotted line position and pivoted in a counterclockwise direction before opening can take place.

In addition to the above, the subject invention includes means to prevent any lateral tilting of the stem in directions lying in planes parallel to the pivot axis between the stem 40 and the cam actuator 16 as defined by the pins 66. The means to prevent this tilting in the subject invention comprise spaced parallel walls 90, 92 which define guide surfaces that are parallel to the outer surfaces of the legs 61a and 62a (see FIG. 3). The walls 90, 92 extend upwardly above the bonnet and engage legs 61a and 62a in close sliding guiding relationship. Although it is of course possible for the walls 90, 92 to be an integral part of the bonnet member 38, in the subject embodiment, they are formed as a portion of an insert member 94 that is positioned between the bonnet and the upper end of the vertical portion of valve body 12. The insert member 94 is best illustrated in FIGS. 4 and 5. As shown therein, it includes a circular base portion 96 having an outwardly extending flange 98. The flange 98 is sized so as to extend under the radially inwardly extending flange 38a on the bonnet 38. Suitable snap tabs 100 are located above the flange 98 a short distance substantially equal to the thickness of bonnet flange 38a. The insert member can then be inserted into position in the bonnet member 38 by being forced upwardly therein until the tabs 100 latch with the top surface of the bonnet. The wall portions 90, 92 are molded integrally with the circular lower wall and are also connected by an integral end wall 102 which gives them lateral rigidity. Wall 102 also provides a vertical guide surface that prevents tilting of the stem in a direction toward wall 102. A suitable tapered brace portion 104 is also connected between the circular bottom 96 and the end wall 102. The circular bottom is further provided with a central opening 106 that closely engages and guides the stem 40.

The arrangement described with respect to the insert member 94 constrains the cam actuator assembly 16 for the desired strictly vertical and rotary movement because of the guide surfaces provided by the walls 90 and 92. Thus, forces acting laterally against the handle in directions parallel to the axis defined by pins 66 cannot cause any inadvertent crack opening which might result from such lateral tilting even though the cam surfaces 76 have not been moved inwardly. Likewise, forces acting perpendicular to back wall 102 cannot, by themselves, produce opening.

With continuing reference to FIGS. 1-5 described above, in certain cases, the bonnet 38 is threaded on the body 12 with excessive torque during assembly or after cleaning, which leads to the flange 98 of the insert member 94 being clamped between the bonnet 38 and the valve body 12. It has generally been deemed desirable for a user to be able to rotate the actuator assembly 16 about the vertical, longitudinal axis of the stem 40, and this requires corresponding rotational movement of the insert member 94 relative to the bonnet 38 and vertical portion 12b of the body. If the insert member 94 is clamped between the bonnet 38 and the body 12, the actuator assembly 16 cannot be rotated as just described without use of undesirably high force which can lead to component breakage and user dissatisfaction.

SUMMARY

In accordance with one aspect of the present development, a faucet for controlling the dispensing of liquids includes a valve body having a valve chamber with an inlet and an outlet. A valve element is located in the valve chamber and is movable from a first position for blocking flow between the inlet and outlet to a second position for permitting flow between the inlet and the outlet. An operating stem has an inner end operatively connected to the valve element and an outer end located external to the body. A bonnet is included, and an insert member is rotatably connected to the bonnet and defines an opening through which the stem extends. The bonnet and insert member are secured to the body and enclose the valve element in the valve chamber. The insert is located such that no portion of the insert member is clamped between the bonnet and the body. Spaced-apart guide walls project outwardly from the insert member external to the valve chamber. An actuator handle assembly is operatively coupled to the outer end of the stem. The actuator handle assembly includes a lever pivotally connected to the outer end of the stem and a cam actuator movably connected to the lever. The cam actuator moves to and between: (i) an engaged position in which pivoting movement of the lever relative to the stem is effective to cause the lever to exert a pulling force on the stem sufficient to move the valve element from its first position to its second position; and, (ii) a disengaged position in which pivoting movement of the lever relative to the stem is ineffective to cause the lever to exert a pulling force on the stem sufficient to move the valve element from its first position to its second position.

In accordance with another aspect of the present development, a faucet for controlling the dispensing of liquids includes a valve body having a valve chamber, an inlet to the valve chamber, an outlet from the valve chamber, and a valve seat located between the inlet and the outlet. A valve element is located in the valve chamber and movable to and between a first position engaged with the seat and a second position spaced from the seat. An operating stem has an inner end operatively connected to the valve element and an outer end. A bonnet includes an insert member rotatably connected thereto. The bonnet is connected to the body such that the bonnet and insert member enclose the valve element in the valve chamber. The insert member defines an opening through which the stem extends such that the outer end of said stem is located external to the valve chamber. The insert member is positioned so as not to be clamped between the bonnet and the body. Spaced-apart guide walls project outwardly from the insert member external to the valve chamber. An actuator handle assembly includes a lever connected to the outer end of the stem and a cam actuator movably connected to the lever. The cam actuator moves relative to the lever to and between: (i) an engaged position in which the actuator handle assembly is operative to move the valve element from the first position to the second position; and, (ii) a disengaged position in which the actuator handle assembly is inoperative to move the valve element from its first position to its second position.

BRIEF DESCRIPTION OF DRAWINGS

FIG. 1 (prior art) is a perspective view of a known dispensing type faucet or valve;

FIG. 2 (prior art) is a side elevational view of the faucet shown in FIG. 1 (portions have been broken away to more clearly show certain features of interior construction);

FIG. 2a (prior art) is a cross-sectional view taken on lines 2A-2A of FIG. 2;

FIG. 3 (prior art) is a front elevational view of the faucet of FIG. 1;

FIG. 4 (prior art) is an exploded view, partially in section, showing the valve element, operating stem and spring, together with the cam handle actuator and bonnet elements that together define an upper portion of the faucet;

FIG. 5 (prior art) is a perspective view of one of the insert elements used in the faucet of FIG. 1;

FIGS. 9A, 9B, 9C and 9D are top, front, side and bottom views of the insert portion of the faucet of FIG. 6.

DETAILED DESCRIPTION OF INVENTION

Figure 6:
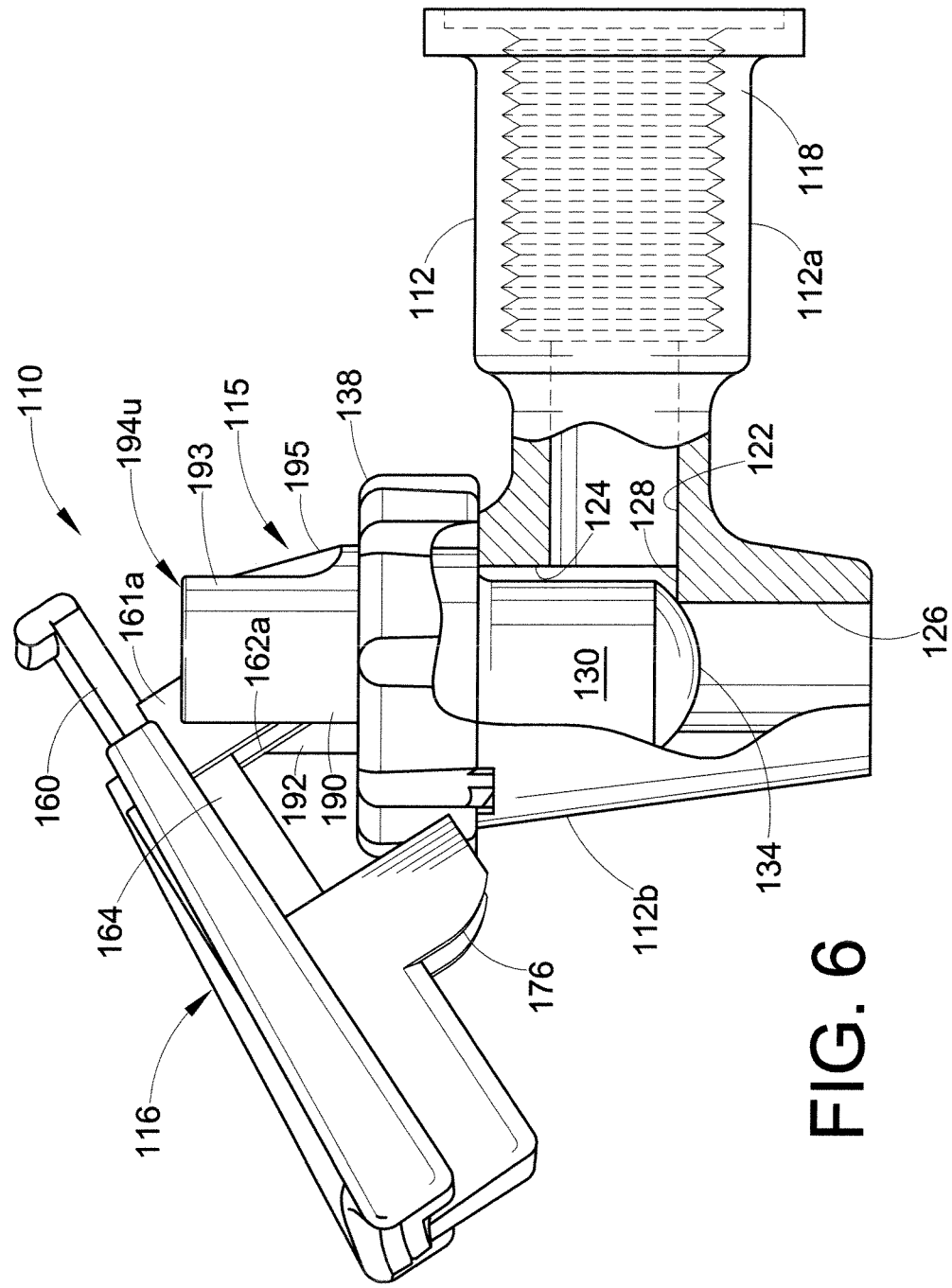
FIG. 6 is a side elevational view of a faucet formed in accordance with the present invention (portions have been broken away to more clearly show certain features of interior construction)

According to the present invention, the faucet 10 described above (and disclosed in U.S. Pat. No. 5,449,144) is modified to replace the bonnet 38 and insert member 94 thereof with a new bonnet 138 and new insert member 194 as described below to define a faucet 110 which, except as shown and/or described herein, is identical to the faucet 10. Like components of the faucet 110 relative to the faucet 10 are identified with like reference numbers that are 100 greater than those used above in connection with the description of the faucet 10, and are not necessarily described again below.

FIG. 6 is a side elevational view of the faucet 110 formed in accordance with the present invention (portions have been broken away to more clearly show certain features of interior construction). The body 112 is identical to the body 12, except that it's inlet end 118 is shown as being a female, internally threaded conformation instead of the male, externally threaded version of the body 12 shown in FIG. 1. The inlet end 118 of body 112 can alternatively be defined with a male, externally threaded connection or can include a rotatable mounting nut for operative connection of the faucet 112 to an liquid container or other liquid supply as in generally known in the art, and it is not intended that the claims be limited to any particular style of inlet end 118 for the body 112. Excepts as noted herein, the structure and operation of the faucet are the same as for the faucet 10 described above and further explanation is not repeated here.

Figure 7:
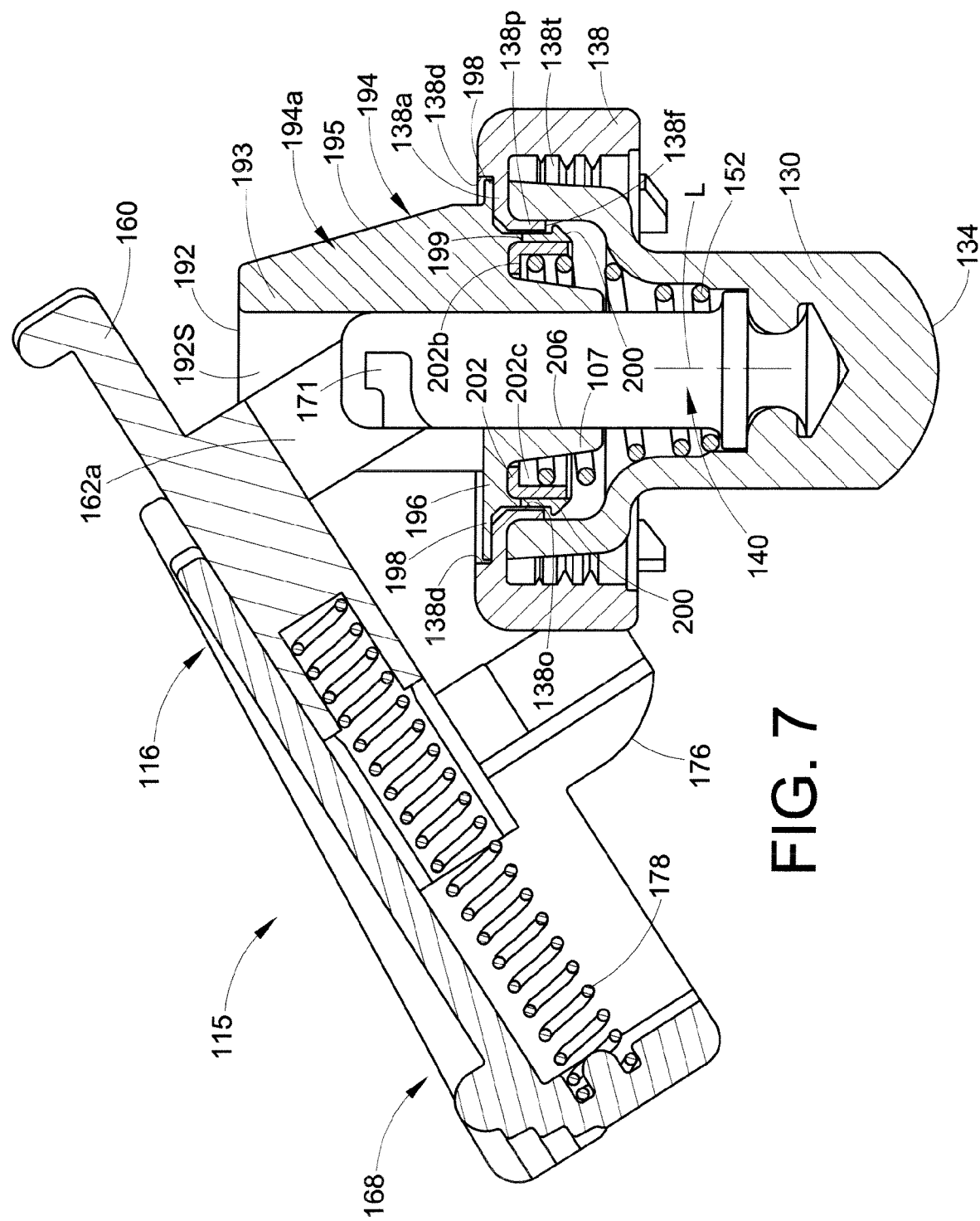
FIG. 7 is a sectioned view of the upper portion of the faucet of FIG. 6.

The faucet 110 comprises an upper portion 115 (shown by itself in FIG. 7) comprising the seat cup valve element 130, operating stem 140, spring 152, cam handle actuator 116, and bonnet and insert elements 138,194. In FIG. 7, which is a sectioned view of the faucet upper portion 115, it can be seen that the faucet 110 includes a bonnet 138 and insert member 194 that are modified relative to the corresponding components of the faucet 10. The upper portion 115 is adapted to be operatively secured to the main body 112 by threaded attachment of the bonnet 138 to the vertical portion 112b of the main body 112 so that the seat cup valve element 130 is operatively positioned to selectively seat on and be unseated from the valve seat 128.

Figure 8A:
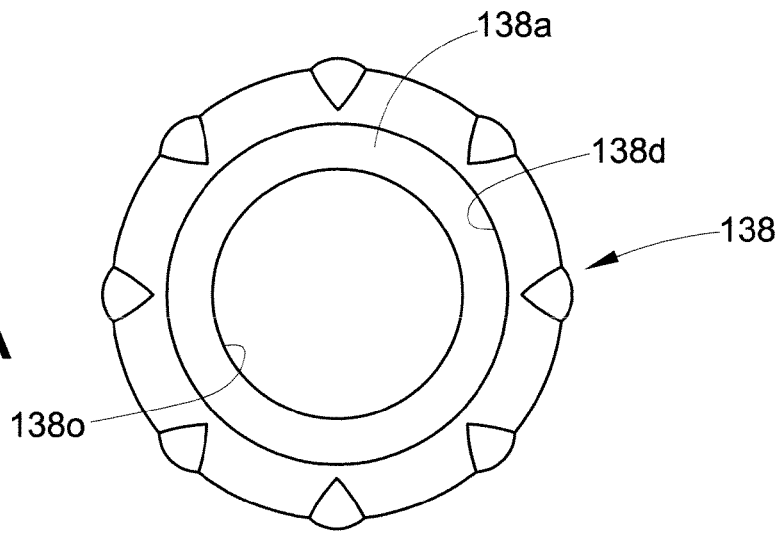
FIGS. 8A, 8B, and 8C are top, side and bottom views of the bonnet portion of the faucet of FIG. 6.
Figure 8B:
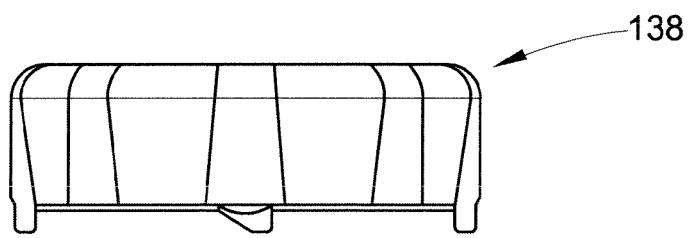
Figure 8C:
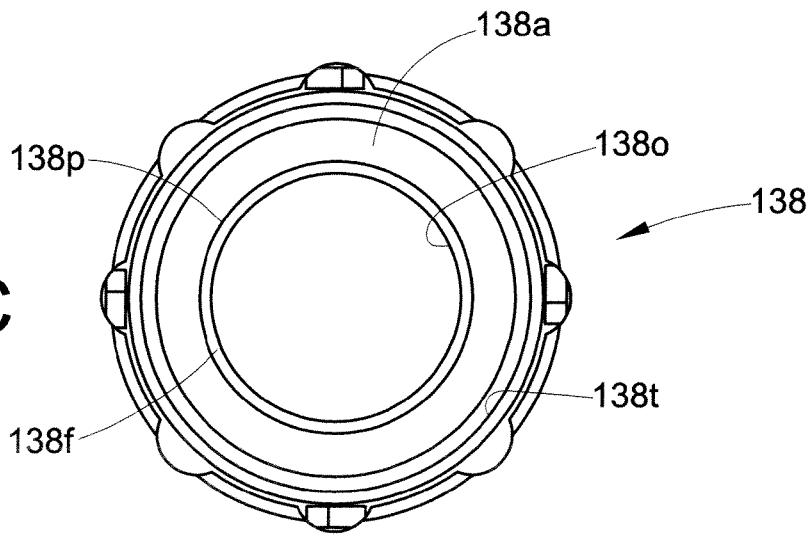

The bonnet 138 is shown in FIGS. 8A-8C and is defined as an annular member including an opening 138o. The bonnet includes internal threads 138t that are adapted to mate with external threads of the body. The bonnet 138 comprises an annular depression 138d in an upper or outer surface. The depression 138d is defined by a radial inwardly extending flange 138a that turns inward or downward at its end to define a lip 138p that defines a periphery of the bonnet opening 138o.

Referring also to FIGS. 9A-9D, the new insert member 194, itself, comprises an upper portion 194u which is essentially identical to the insert member 94 in that it comprises spaced parallel walls 190, 192 that define guide surfaces 190s,192s that are parallel to the outer surfaces of the legs 161a and 162a of the actuator handle 116. Walls 190,192 are connected by a transverse end wall 193, which is preferably strengthened by a brace 195.

When the insert member 194 is operably mated with the corresponding bonnet 138, the walls 190,192,193 extend upwardly above the bonnet 138, and the legs 161a and 162a of the actuator assembly 16 are located between the walls 190,192 with a close, sliding, guiding relationship, to ensure that the legs 161a,162a move only rotationally in respective vertical planes parallel to the walls 190,192. The insert member 194 and bonnet 138 are each preferably defined as a one-piece molded polymeric or "plastic" component. For certain applications, e.g., high-temperature applications, bonnet 138 can be defined as a metal component.

The insert member 194 also includes a base portion 196 from which the walls 190,192,193 extend. The base portion 196 comprises an outwardly extending flange 198. As shown in FIGS. 7 and 8A, the flange 198 is sized so as to be received in the annular depression 138d (FIG. 8A) of the bonnet as defined by the radially inward extending flange 138a of the bonnet 138. The flange 198 of the insert member 194 is rotatable in the depression 138d of the bonnet 138 while in sliding contact with the flange 138a. This can be accomplished with a variety of different arrangements, e.g., by forming the depression 138d and flange 198 with circular peripheries as shown or using any other suitable structures that allow rotational movement of the insert flange 198 in the bonnet depression 138d. Preferably, the insert flange 198 fits closely in the depression 138d with minimal radial clearance to minimize radial movement of the insert member 194 relative to the bonnet 138.

The inwardly extending flange 138a of bonnet 138 includes a lip 138p that terminates in a face 138f arranged perpendicular or otherwise transverse to the longitudinal axis L of the stem 140. The lip 138p thus provides a boss that projects from an inner face of the bonnet 138 and through which the bonnet opening 138o extends.

Below the flange 198 of the base portion 196, the insert member 194 includes an annular skirt portion 199 that comprises suitable snap tabs 200 including outwardly directed bite-teeth 200t. The skirt portion 199 is dimensioned so as to be insertable into the bonnet opening 138o from above with minimal radial clearance, so that the flange 198 of the insert member 194 seats in the depression 138d. The bite teeth 200t of the snap tabs 200 slide within the lip 138p during this insert member installation operation until the bite teeth 200t encounter the transverse face 138f of the lip 138p, at which position that bite teeth 200t move resiliently outward toward or fully to their free or relaxed state where the bite teeth 200t engage the transverse face 138f to inhibit axial separation of the insert member 194 from the bonnet 138 in a reverse manner to the just-described installation procedure. The bonnet 138 and insert 194 are connected to the valve body 112 as a unit to capture or enclose the seat cup valve element 130 in the valve chamber 124.

The insert member includes an opening 206 (FIGS. 7, 9A, 9D) in which the stem 140 is slidably received as described above so that the outer end of the stem 140 is located between the walls 190,192 of the insert member 194 for connection to the legs 161a,162a of the actuator assembly 116. The opening 206 of the insert member extends through a boss 107 that is surrounded by the skirt portion 199 of the insert member so that an annular space 194s (FIG. 9D) is defined between the boss 107 and skirt portion 199. The boss 107 projects into the coil spring 152 so as to provide a locator for the spring 152. Likewise, the open upper end of the seat cup valve element 130 closely surrounds the boss defined by the bonnet lip 138p. As shown in FIG. 7, a one-piece metal (e.g., brass) or polymeric spacer ring 202 encircles the boss 107 of the insert 194 and fits closely in the space between the skirt 199 and boss 107. In the illustrated embodiment, the spacer ring 202 is L-shaped in cross-section, with a base 202b abutted with the base portion 196 of the insert member 194, and with a second, cylindrical wall 202c that abuts the skirt 199 of the insert 194. The coil spring 152 is abutted with the base wall 202b of the spacer 202, and the spring is partially radially contained by the cylindrical wall 202c. The spacer ring 202 prevents undesired radial inward movement or deflection of the snap tabs 200 of the insert skirt 199 as would allow the bite teeth 200t thereof to disengage from the transverse face 138f of the lip 138p. In general, the spacer ring 202 fills the radial gap between the snap tabs 200 and the boss 107 to block radial inward movement of the snap tabs 200 after the insert member 194 is connected to the bonnet 138 to inhibit separation of the insert member 194 from the bonnet 138. As such, the spacer ring 202 can have any other suitable shape or cross sectional profile that accomplishes this result.

Those of ordinary skill in the art will recognize that when the alternative upper portion 115 is mated with a faucet body 112 (or faucet body 12) by threading the bonnet 138 thereto, the insert member 194 is rotatable relative to the bonnet 138 with the actuator handle 116 and the stem 140 about the stem axis L in response to manual rotational force applied to the actuator handle assembly 116 by a user. The insert member 194 is not clamped between the bonnet 138 and body 112 as described above in relation to the known faucet assembly 10. The insert member is still securely captured to the bonnet 138 as described to prevent its undesired separation from the bonnet 138 during normal use of the faucet 110 or during ordinary inadvertent contact of the faucet 110 as occurs in day-to-day use.

The invention has been described with reference to preferred embodiments. It is not intended that the invention be limited in any manner to the preferred embodiments. Instead, the invention should be construed as encompassing all modifications and alterations that fall within the scope of the properly construed claims.

The invention claimed is:

1. A faucet for controlling the dispensing of liquids comprising:
    a valve body having a valve chamber with an inlet and an outlet;
    a valve element in the valve chamber movable from a first position for blocking flow between the inlet and outlet to a second position for permitting flow between the inlet and the outlet;
    an operating stem having an inner end operatively connected to the valve element and an outer end located external to the body;
    a bonnet removably threaded to the valve body;
    an insert member rotatably connected to the bonnet and defining an opening through which the stem extends, wherein said bonnet and insert member are secured to the body and enclose said valve element in said valve chamber, wherein said insert is located such that no portion of said insert member is clamped between said bonnet and said valve body, said bonnet comprising an annular member including a depression defined in an outer surface of said bonnet by a radial inwardly extending bonnet flange, and said insert member comprising a base including a radial outwardly extending insert flange, said insert flange seated in said depression defined in said outer surface of said bonnet and located external to said valve body and said bonnet such that said bonnet flange is located between said valve body and said insert flange, wherein said insert flange is slidably rotatable in said depression relative to said bonnet flange;
    spaced-apart guide walls projecting outwardly from said insert member external to said valve chamber;
    an actuator handle assembly operatively coupled to the outer end of the stem, said actuator handle assembly including a lever pivotally connected to the outer end of the stem and a cam actuator movably connected to the lever, wherein said cam actuator moves to and between:
        (i) an engaged position in which pivoting movement of said lever relative to said stem is effective to cause said lever to exert a pulling force on said stem sufficient to move said valve element from its first position to its second position; and,
        (ii) a disengaged position in which pivoting movement of said lever relative to said stem is ineffective to cause said lever to exert a pulling force on said stem sufficient to move said valve element from its first position to its second position.

2. The faucet as set forth in claim 1, wherein said insert flange is seated in said depression of said bonnet with minimal radial clearance such that radial movement between said insert member and said bonnet is minimized.

3. The faucet as set forth in claim 1, wherein said insert member further comprises a skirt portion defined by a plurality of tabs each including a bite tooth, and wherein said insert member is snap-fit to said bonnet by engagement of the bite tooth of each tab with said bonnet.

4. The faucet as set forth in claim 3, wherein said bonnet flange comprises a lip that defines an opening in said bonnet, and wherein said skirt portion of said insert member is located in said opening of said bonnet, with the bite tooth of each tab engaged with said lip.

5. The faucet as set forth in claim 4, wherein said insert comprises a boss that surrounds the opening in said insert member, wherein said boss is surrounded by said skirt portion such that a space is defined between said boss and said skirt, said faucet further comprising a spacer ring seated in the annular space between the boss and the skirt, said spacer ring inhibiting radial inward deflection of the tabs of the skirt portion and disengagement of each bite tooth from the lip of the bonnet.

6. The faucet as set forth in claim 5, wherein said annular spacer ring comprises an L-shaped cross section comprising a first portion that is abutted with said base of said insert member and a second portion that is abutted with said tabs of said skirt portion.

7. The faucet as set forth in claim 6, wherein said annular spacer ring is defined as a one-piece metallic construction.

8. The faucet as set forth in claim 5, further comprising a spring that biases said valve element into its first position, wherein said spring is coaxially positioned about said stem and said boss projects into an open end of said spring.

9. The faucet as set forth in claim 4, wherein said valve body defines a valve seat between said valve chamber and said outlet, and wherein said valve element comprises a polymeric seat cup comprising a closed end adapted to sealingly engage said valve seat when said valve element is located in said first position, said polymeric further comprising an open end in which said lip of said bonnet is received.

10. The faucet as set forth in claim 1, wherein said valve body defines a valve seat between said valve chamber and said outlet, and wherein said valve element comprises a polymeric seat cup comprising a closed end adapted to sealingly engage said valve seat when said valve element is located in said first position.

11. The faucet as set forth in claim 1, wherein said cam actuator of said actuator handle assembly is spring-biased to said disengaged position.

12. The faucet as set forth in claim 11, wherein said cam actuator comprises at least one cam surface that is adapted to engage at least one of said bonnet and said insert when said cam actuator is located in its engaged position.

13. The faucet as set forth in claim 1, wherein said spaced-apart guide walls are defined as a one-piece construction together with said insert member.

14. The faucet as set forth in claim 13, wherein said lever of said actuator handle assembly is closely received between said spaced-apart guide walls such that said lever pivots relative to said stem between said spaced-apart guide walls about only a single pivot axis.

15. A faucet for controlling the dispensing of liquids comprising:
  a valve body having a valve chamber, an inlet to the valve chamber, an outlet from the valve chamber, and a valve seat located between the inlet and the outlet;
  a valve element in the valve chamber movable to and between a first position engaged with the seat and a second position spaced from the seat;
  an operating stem having an inner end operatively connected to the valve element and an outer end;
  a bonnet including an insert member rotatably connected thereto, said bonnet removably connected to said body such that said bonnet and insert member enclose said valve element in said valve chamber, said insert member defining an opening through which said stem extends such that said outer end of said stem is located external to said valve chamber, wherein said insert member is positioned so as not to be clamped between said bonnet and said valve body, wherein said bonnet comprises a bonnet opening surrounded by an external depression that is defined in an outer surface of said bonnet, said insert member comprising: (i) a skirt portion inserted in said bonnet opening and engaged with said bonnet to capture said insert member to said bonnet while allowing said insert member to rotate relative to said bonnet; and, (ii) an insert flange seated in said external depression of said bonnet and in rotatable sliding contact with said bonnet outer surface external to said valve chamber, wherein said bonnet outer surface is located between said valve body and said insert flange;
  spaced-apart guide walls projecting outwardly from said insert member external to said valve chamber;
  an actuator handle assembly including a lever connected to the outer end of the stem and a cam actuator movably connected to the lever, wherein said cam actuator moves relative to said lever to and between:
    (i) an engaged position in which said actuator handle assembly is operative to move said valve element from said first position to said second position; and,
    (ii) a disengaged position in which said actuator handle assembly is inoperative to move said valve element from its first position to its second position.

16. A faucet for controlling the dispensing of liquids comprising:
  a valve body having a valve chamber, an inlet to the valve chamber, an outlet from the valve chamber, and a valve seat;
  a valve element located in the valve chamber and movable to and between a first position engaged with the seat and a second position spaced from the seat;
  an operating stem comprising an inner end operatively connected to the valve element and an outer end;
  a bonnet including an insert member rotatably connected thereto, said bonnet connected to said body such that said bonnet and insert member enclose said valve element in said valve chamber, said insert member defining an opening through which said stem extends such that said outer end of said stem is located external to said valve chamber, wherein said insert member is positioned with a flange of said insert member in contact with an external outer surface of said bonnet external to said valve chamber such that said bonnet is located between said flange of said insert member and said valve body to prevent said flange of said insert member from being clamped between said bonnet and said valve body;
  spaced-apart guide walls projecting outwardly from said insert member external to said valve chamber;
  an actuator handle assembly including a lever connected to the outer end of the stem and a cam actuator movably connected to the lever, wherein said cam actuator moves relative to said lever to and between:
    (i) an engaged position in which said actuator handle assembly is operative to move said valve element from said first position to said second position; and,
    (ii) a disengaged position in which said actuator handle assembly is inoperative to move said valve element from its first position to its second position;
  wherein said actuator handle, said stem, and said insert member are rotatable relative to the bonnet in response to manual rotational force applied to the actuator handle.

* * * * *